United States Patent
Sodani et al.

(10) Patent No.: US 11,734,608 B2
(45) Date of Patent: *Aug. 22, 2023

(54) ADDRESS INTERLEAVING FOR MACHINE LEARNING

(71) Applicant: Marvell Asia Pte, Ltd., Singapore (SG)

(72) Inventors: Avinash Sodani, San Jose, CA (US); Ramacharan Sundararaman, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,810

(22) Filed: Dec. 23, 2020

(65) Prior Publication Data
US 2021/0117866 A1  Apr. 22, 2021

Related U.S. Application Data

(63) Continuation of application No. 16/420,078, filed on May 22, 2019, now Pat. No. 10,929,778, which is a
(Continued)

(51) Int. Cl.
*G06F 9/38* (2018.01)
*G06F 12/06* (2006.01)
(Continued)

(52) U.S. Cl.
CPC ......... *G06N 20/00* (2019.01); *G06F 12/0607* (2013.01); *G06F 9/3895* (2013.01); *G06F 9/3897* (2013.01); *G06F 12/0851* (2013.01); *G06F 15/17* (2013.01); *G06F 15/781* (2013.01); *G06F 15/7807* (2013.01); *G06F 15/7857* (2013.01); *G06F 15/80* (2013.01); *G06F 2212/1041* (2013.01)

(58) Field of Classification Search
CPC ............... G06F 9/3895; G06F 12/0851; G06F 12/0607; G06N 20/00
See application file for complete search history.

(56) References Cited

U.S. PATENT DOCUMENTS 4,982,291 A    1/1991  Kurahashi et al.
5,329,611 A    7/1994  Pechanek et al.
(Continued)

FOREIGN PATENT DOCUMENTS

WO    2018222904 A1    12/2018

OTHER PUBLICATIONS

NanoMesh: An Asynchronous Kilo-Core System-on-Chip, Tse, et al. 2013 19th IEEE International Symposium on Asynchronous Circuits and Systems.
(Continued)

*Primary Examiner* — Jacob Petranek

(57) ABSTRACT

A system includes a memory, an interface engine, and a master. The memory is configured to store data. The inference engine is configured to receive the data and to perform one or more computation tasks of a machine learning (ML) operation associated with the data. The master is configured to interleave an address associated with memory access transaction for accessing the memory. The master is further configured to provide a content associated with the accessing to the inference engine.

16 Claims, 3 Drawing Sheets

Related U.S. Application Data continuation-in-part of application No. 16/226,539, filed on Dec. 19, 2018, now Pat. No. 10,824,433.

(60) Provisional application No. 62/675,076, filed on May 22, 2018.

(51) Int. Cl.
| | | |
|---|---|---|
| *G06N 20/00* | (2019.01) | |
| *G06F 15/78* | (2006.01) | |
| *G06F 15/17* | (2006.01) | |
| *G06F 12/0846* | (2016.01) | |
| *G06F 15/80* | (2006.01) | |

(56) References Cited

U.S. PATENT DOCUMENTS

| | | | |
|---|---|---|---|
| 5,481,487 A | 1/1996 | Jang et al. | |
| 6,128,638 A | 10/2000 | Thomas | |
| 6,282,583 B1 | 8/2001 | Pincus et al. | |
| 6,415,377 B1 | 7/2002 | Wolf et al. | |
| 6,577,312 B2 | 6/2003 | Deering et al. | |
| 6,640,262 B1 | 10/2003 | Uppunda et al. | |
| 7,089,380 B1 | 8/2006 | Schober | |
| 7,191,163 B2 | 3/2007 | Herrera et al. | |
| 7,509,363 B2 | 3/2009 | Clifton | |
| 7,809,663 B1 | 10/2010 | Birch et al. | |
| 7,840,914 B1 | 11/2010 | Agarwal et al. | |
| 7,912,883 B2 | 3/2011 | Hussain | |
| 8,200,728 B2 | 6/2012 | Michaels et al. | |
| 8,200,940 B1 | 6/2012 | Lindholm | |
| 8,209,703 B2 | 6/2012 | Yee et al. | |
| 8,504,954 B1 | 8/2013 | Arnold | |
| 8,583,896 B2 | 11/2013 | Cadambi et al. | |
| 8,738,860 B1 | 5/2014 | Griffin et al. | |
| 8,838,663 B2 | 9/2014 | Tang et al. | |
| 9,015,217 B2 | 4/2015 | Arnold et al. | |
| 9,954,771 B1 | 4/2018 | Levy et al. | |
| 10,161,786 B2 | 12/2018 | Chang et al. | |
| 10,296,556 B2 | 5/2019 | Zhou | |
| 10,305,766 B1 | 5/2019 | Zhang et al. | |
| 11,106,432 B2 | 8/2021 | Mangnall et al. | |
| 11,604,799 B1 | 3/2023 | Bigdelu et al. | |
| 2003/0204674 A1* | 10/2003 | Ryan | G11C 7/1045 711/167 |
| 2004/0153501 A1 | 8/2004 | Yamashita et al. | |
| 2007/0122347 A1 | 5/2007 | Statnikov et al. | |
| 2008/0040577 A1 | 2/2008 | Nemirovsky et al. | |
| 2009/0158005 A1 | 6/2009 | Carmichael | |
| 2011/0219208 A1 | 9/2011 | Asaad et al. | |
| 2011/0307890 A1 | 12/2011 | Achilles et al. | |
| 2013/0101035 A1 | 4/2013 | Wang et al. | |
| 2013/0117521 A1 | 5/2013 | Li et al. | |
| 2014/0007098 A1 | 1/2014 | Stillwell, Jr. et al. | |
| 2015/0019836 A1 | 1/2015 | Anderson et al. | |
| 2015/0106568 A1 | 4/2015 | Feldman et al. | |
| 2015/0309808 A1 | 10/2015 | Nandy et al. | |
| 2015/0347012 A1* | 12/2015 | Dewitt | G06F 13/28 711/103 |
| 2016/0124651 A1* | 5/2016 | Sankaranarayanan | G06F 9/30036 711/165 |
| 2016/0132272 A1 | 5/2016 | Iwashita | |
| 2016/0170916 A1* | 6/2016 | Deshpande | G06F 13/1684 710/317 |
| 2016/0224465 A1 | 8/2016 | Morad et al. | |
| 2017/0068571 A1 | 3/2017 | Lu et al. | |
| 2017/0083313 A1 | 3/2017 | Sankaralingam et al. | |
| 2017/0228345 A1 | 8/2017 | Gupta et al. | |
| 2017/0351642 A1 | 12/2017 | Omtzigt | |
| 2017/0353397 A1 | 12/2017 | Che | |
| 2017/0364694 A1 | 12/2017 | Jacob et al. | |
| 2018/0046458 A1 | 2/2018 | Kuramoto | |
| 2018/0047126 A1 | 2/2018 | Falkenstern et al. | |
| 2018/0114114 A1 | 4/2018 | Molchanov et al. | |
| 2018/0260220 A1 | 9/2018 | Lacy et al. | |
| 2018/0286016 A1 | 10/2018 | Bar-On et al. | |
| 2018/0293782 A1 | 10/2018 | Benthin et al. | |
| 2018/0307980 A1 | 10/2018 | Barik et al. | |
| 2018/0315158 A1 | 11/2018 | Nurvitadhi et al. | |
| 2018/0341484 A1 | 11/2018 | Fowers et al. | |
| 2019/0121641 A1 | 4/2019 | Knowles et al. | |
| 2019/0121679 A1 | 4/2019 | Wilkinson et al. | |
| 2019/0147471 A1 | 5/2019 | McKelvey, Jr. et al. | |
| 2019/0171604 A1 | 6/2019 | Brewer | |
| 2020/0082198 A1 | 3/2020 | Yao et al. | |
| 2020/0242734 A1 | 7/2020 | Wang et al. | |
| 2021/0133911 A1 | 5/2021 | Yao et al. | |
| 2021/0216874 A1 | 7/2021 | Jegou et al. | |
| 2023/0024035 A1 | 1/2023 | Thuerck et al. | |
| 2023/0071931 A1 | 3/2023 | Huang et al. | |

OTHER PUBLICATIONS

Ceze, L., et al. Colorama: Architectural Support for Data-Centric Synchronization, 2007, IEEE, pp. 134-144 (Year: 2007).

Brewer, "Instructions Set Innovations for the Convey HC-1 Computer", 2010, pp. 70-79, Year: 2010.

Seng, et al. "Reducing Power with Dynamic Critical Path Information", Jan. 1999, pp. 114-123; Year: 1999.

\* cited by examiner

ADDRESS INTERLEAVING FOR MACHINE LEARNING

CROSS-REFERENCE TO RELATED APPLICATIONS

This application is a continuation of U.S. patent application Ser. No. 16/420,078, filed May 22, 2019, which is a continuation-in-part of U.S. patent application Ser. No. 16/226,539, filed Dec. 19, 2018, now U.S. Pat. No. 10,824, 433, issued Nov. 3, 2020, and claims the benefit of U.S. Provisional Patent Application No. 62/675,076, filed May 22, 2018, which are incorporated herein in their entirety by reference.

BACKGROUND

Applied Machine Learning (ML) is a booming field that utilizes a cascade of layers of nonlinear processing units and algorithms for feature extraction and transformation with a wide variety of usages and applications. ML typically involves two phases, training, which uses a rich set of training data to train a plurality of machine learning models, and inference, which applies the trained machine learning models to actual applications. Each of the two phases poses a distinct set of requirements for its underlying infrastructures. Various infrastructures may be used, e.g., graphics processing unit (GPU), a central processing unit (CPU), a Field Programmable Gate Array (FPGA), an Application Specific Integrated Circuit (ASIC), etc. Specifically, the training phase focuses on, as a non-limiting example, GPU or ASIC infrastructures that scale with the trained models and retraining frequency, wherein the key objective of the training phase is to achieve high performance and reduce training time. The inference phase, on the other hand, focuses on infrastructures that scale with the applications, user, and data, and the key objective of the inference phase is to achieve energy (e.g., performance per watt) and capital (e.g., return on investment) efficiency.

Inference phase of ML is usually very computationally and data intensive. Unfortunately, as the input data and model sizes grow, data movement becomes a bottleneck and data processing increases because in order to perform simple processing, three operations or instructions are performed for each data, e.g., load, processing, and store. As the amount of data grows, performing these three operations or instructions becomes burdensome. Moreover, the current computing architecture is not scalable and are not well suited for ML and its applications, since a lot of time goes in loading and storing the data in comparison to processing the data.

The foregoing examples of the related art and limitations related therewith are intended to be illustrative and not exclusive. Other limitations of the related art will become apparent upon a reading of the specification and a study of the drawings.

SUMMARY

Accordingly, a need has arisen to improve memory access and to utilize bandwidth efficiently, thereby alleviating bottleneck resulting from data movement and memory access. In some nonlimiting examples, memory accesses are interleaved across multiple channels. In other words, the addresses associated with memory accesses are interleaved across multiple channels.

In some nonlimiting embodiments, a system includes a memory, an interface engine, and a master. The memory is configured to store data. The inference engine is configured to receive the data and to perform one or more computation tasks of a machine learning (ML) operation associated with the data. The master is configured to interleave an address associated with memory access transaction for accessing the memory. The master is further configured to provide a content associated with the accessing to the inference engine.

It is appreciated that in some embodiments the memory is a dynamic random access memory (DRAM). In some embodiments the memory may be a double data rate (DDR).

According to some embodiments, a subset of bits of the interleaved address is used to determine an appropriate channel through which to access the memory. In some embodiments, the interleaving includes moving channel identifier bits within the address to highest order bits. The channel identifier bits identify an appropriate channel through which to access the memory. The interleaving further includes shifting down address bits with bit orders higher than bit order of channel identifier bits before the moving. The shifting down is by a same order as a number of channel identifier bits. The moving and the shifting down forms the interleaved address. According to some embodiments, the system further includes a network interface controller. The network interface controller in some embodiments only supports address interleaving at a granularity greater than a burst length of the address.

These and other aspects may be understood with reference to the following detailed description.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
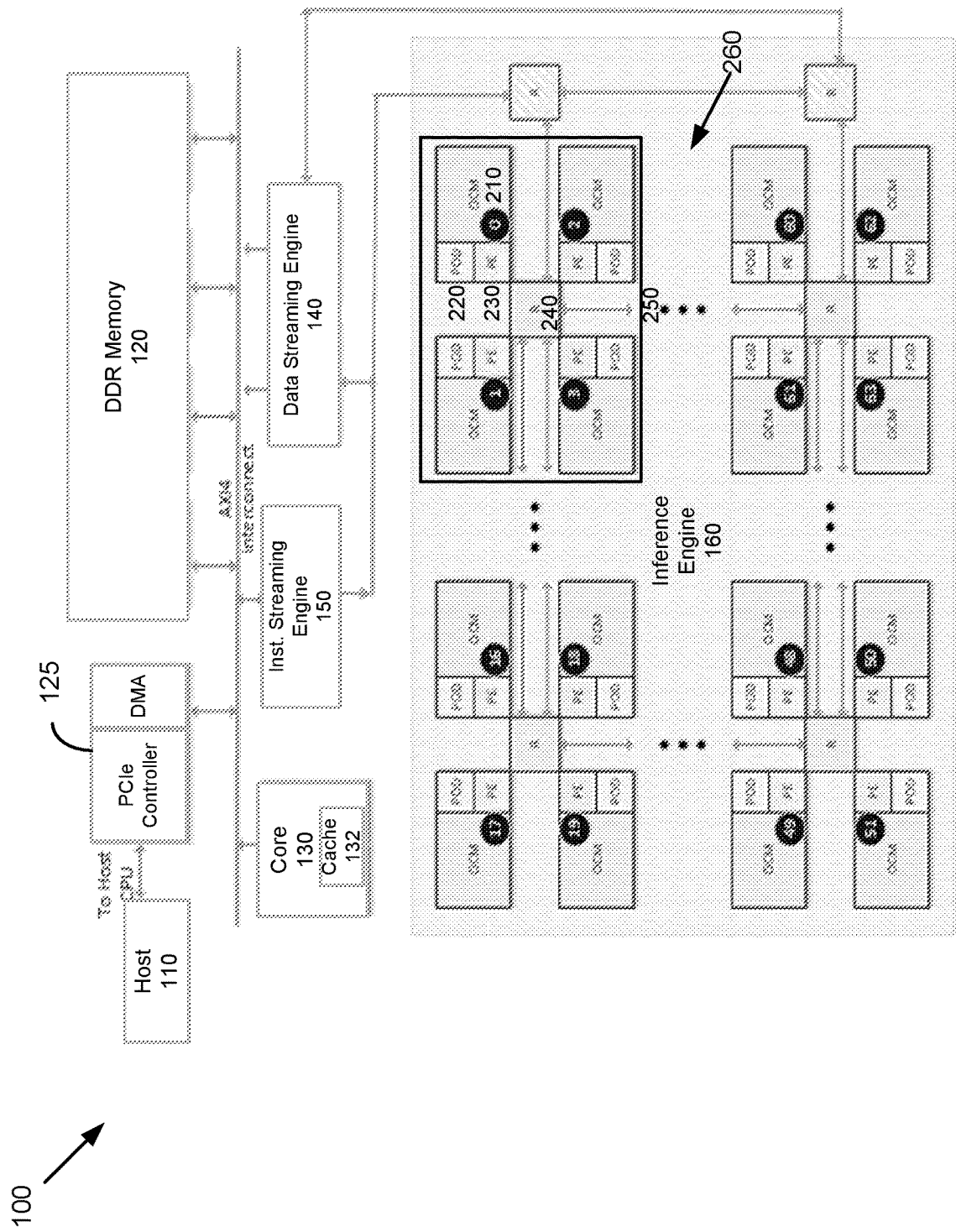
FIG. 1 depicts an example of diagram of a hardware-based programmable architecture configured to support inference acceleration for machine learning according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

FIG. 1 depicts an example of a diagram of a hardware-based programmable system/architecture 100 configured to support inference acceleration for machine learning. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

Each of the engines in the architecture 100 is a dedicated hardware block/component including one or more microprocessors and on-chip memory units storing software instructions programmed by a user for various machine learning operations. When the software instructions are executed by the microprocessors, each of the hardware components becomes a special purposed hardware component for practicing certain machine learning functions as discussed in detail below. In some embodiments, the architecture 100 is on a single chip, e.g., a system-on-chip (SOC).

In the example of FIG. 1, the architecture 100 may include a host 110 coupled to a memory (e.g., Double Data Rate (DDR), Dynamic Random Access Memory (DRAM), high bandwidth memory (HBM), etc.) 120 and a core engine 130 via a PCIe controller and/or a direct memory access (DMA) module 125. The host 110 is a processing unit configured to receive or generate data to be analyzed and/or inferred by architecture 100 via machine learning. The DDR memory 120 is coupled to a data streaming engine 140 configured to transfer/stream data between the DDR memory 120 and on-chip memory (OCM) 210 of an inference engine 160 discussed below via DDR-to-OCM DMA or DoD. The core 130 is a processing engine configured to receive and interpret a plurality of ML commands from the host 110 into instructions for a ML operation. The core 130 is also configured to process a plurality of performance non-critical operations, e.g., data/instruction preparatory work, data collection, data mapping, etc. The core 130 is coupled to an instruction-streaming engine 150, which accepts instructions destined for the inference engine 160 from the core 130 and distributes the instructions to the appropriate units within the inference engine 160. The inference engine 160 is configured to perform dense and sparse operations on received stream of data, e.g., to identify a subject in an image, by using the training data and executing the programming instructions received from the instruction-streaming engine 150.

In some embodiments, the inference engine 160 includes a two-dimensional computing array of processing tiles, e.g., tiles 0, ..., 63, arranged in, e.g., 8 rows by 8 columns. Each processing tile (e.g., tile 0) includes at least one on-chip memory (OCM) e.g., 210, one POD engine (or POD), e.g., 220, and one processing engine/element (PE), e.g., 230. Here, the OCMs in the processing tiles are configured to receive data from the data streaming engine 140 in a streaming fashion. The OCMs enable efficient local access to data per processing tile. The PODs are configured to perform dense or regular computations on the received data in the OCMs, e.g., matrix operations such as multiplication, matrix manipulation, tanh, sigmoid, etc., and the PEs are configured to perform sparse/irregular computations and/or complex data shape transformations of the received data in the OCMs, e.g., memory transpose, addition operation, operations on irregular data structures (such as trees, graphs, and priority queues), respectively. Both the PODs and the PEs can be programmed according to the programming instructions received from the instruction-streaming engine 150. Accordingly, the data is received and processed by each processing tile as an input data stream from the DDR memory 120 and the result is output by each processing tile as a stream of data to the DDR memory 120.

In some embodiments, a plurality of (e.g., four) processing tiles in the inference engine 160 together form a processing block or quad 250, e.g., processing tiles 0-3 form processing block 250, wherein the processing tiles within each processing block 250 are coupled to one another via a routing element 240. In some embodiments, all the routing elements are connected together as a mesh 260 of interconnect to connect the processing blocks in the same row or column as a two-dimensional array. It is appreciated that the number and/or types of components within each processing tile, the formation of the processing blocks, the number of processing tiles in each processing block, and the number of processing blocks in each row and column of the inference engine 160 as shown in FIG. 1 are exemplary and should not be construed as limiting the scope of the embodiments. In some embodiments, the same number of PE and POD may be used for each tile, and the same number of blocks may be used in each row and column in order to provide flexibility and scalability.

Figure 2:
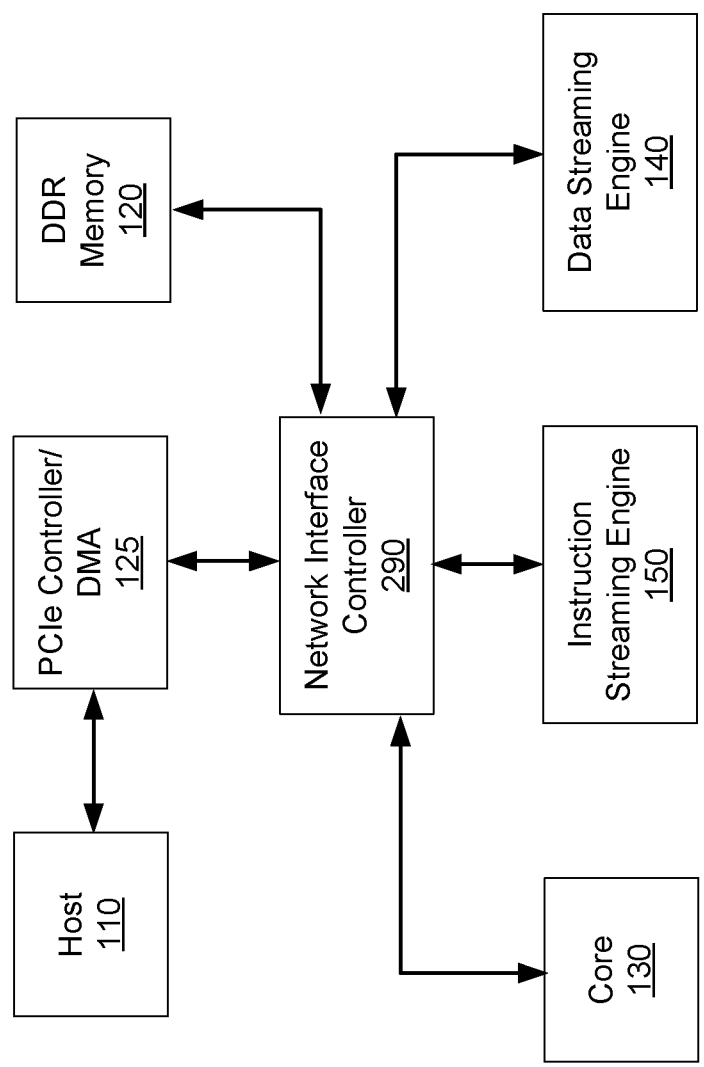
FIG. 2 depicts an example of diagram of a hardware-based programmable architecture configured to interleave addresses for improving data access for machine learning according to one aspect of the present embodiments.

Referring now to FIG. 2, an example of diagram of a hardware-based programmable architecture configured to interleave addresses for improving data access for machine learning according to one aspect of the present embodiments is shown. The system may include the host 110, the PCIe controller/DMA 125, the core 130, the instruction streaming engine 150, and a data streaming engine 140 that operates substantially similar to that described in FIG. 1. In some nonlimiting examples a network interface controller (NIC) 290 may be coupled to facilitate transactions, e.g., instructions, commands, read requests, write requests, etc., between various components, e.g., the host 110, the PCIe controller/DMA 125, the core 130, the instruction streaming engine 150, the data streaming engine 140, etc., and the DDR memory 120 and/or to the OCMs 210 of the inference engine 160. It is appreciated that while the illustrated example is described with respect to a DDR memory, other types of memory components may be used, e.g., DRAM, HBM, etc., and that describing the embodiments with respect to DDR should not be construed as limiting the scope.

As presented above, memory accesses may cause bottleneck. In order to address the bottleneck resulting from memory access, the bandwidth associated with DRAM, DDR, etc., should be utilized more efficiently. In some nonlimiting examples, memory accesses are interleaved across multiple channels. In other words, the addresses associated with memory accesses are interleaved across multiple channels.

In a low power double data rate (LPDDR) system, the minimum burst length is 16. Thus, the minimum granularity of interleave is 128B. Unfortunately, NIC 290 may not support address interleaving of less than a certain size, e.g., 4 kB. Accordingly, the interleaving for addresses less than 4 kB, as an example, should be performed by each component (also referred to as master hereinafter), e.g., the host 110, the PCIe controller/DMA 125, the core 130, the instruction streaming engine 150, the data streaming engine 140, etc. In other words, each master may perform an address-bit swizzle at connectivity level with no logic involved (described in greater detail in FIG. 3). The address interleaving is followed by the master transaction, e.g., ARM Core Complex (ACC), DDR-OCM-DMA (DOD), read, write, etc., to the DDR memory 120.

Figure 3:
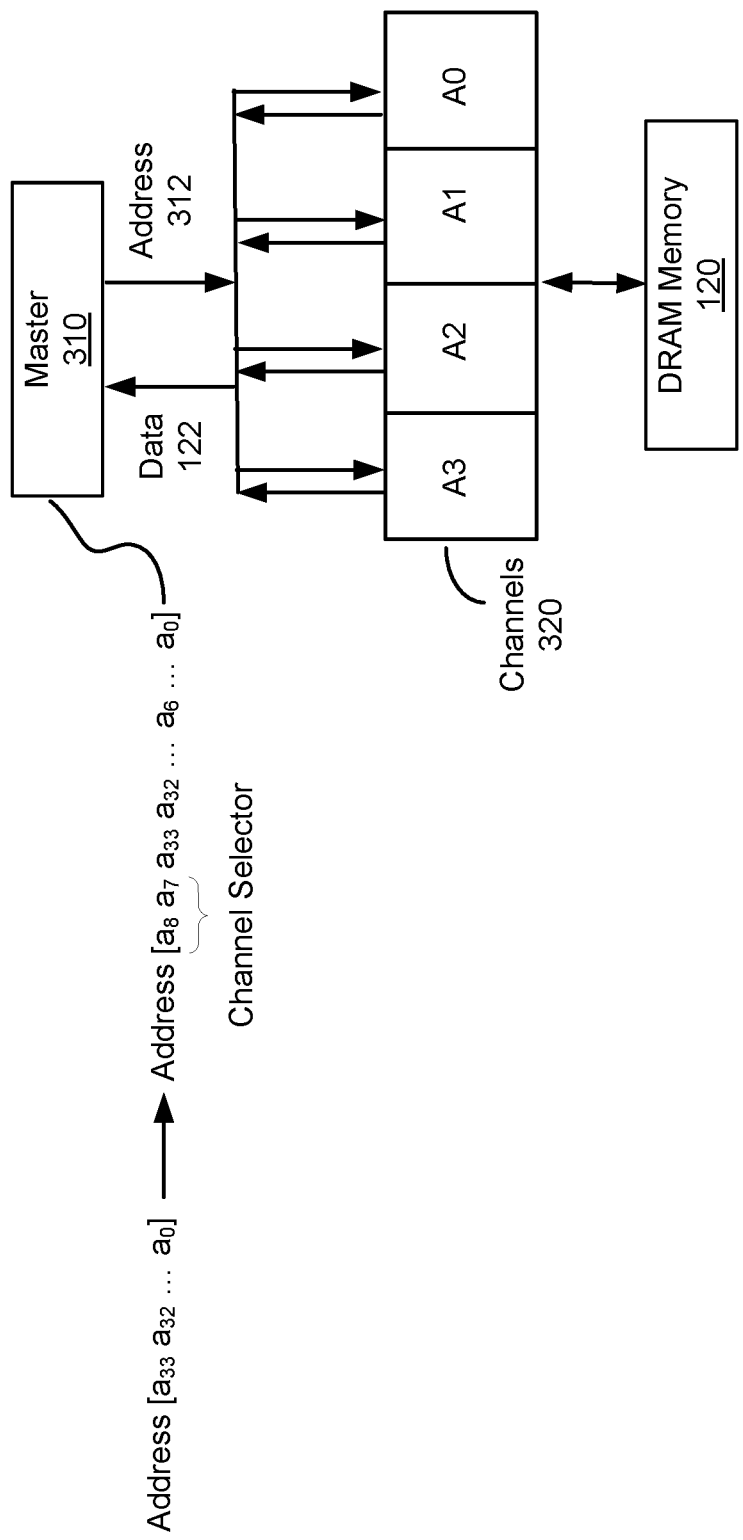
FIG. 3 depicts an example of diagram of a master component in a programmable architecture for machine learning configured to interleave addresses to improve data access and utilize bandwidth efficiently according to one aspect of the present embodiments.

Referring now to FIG. 3, an example of diagram of a master component in a programmable architecture for machine learning configured to interleave addresses to improve data access and utilize bandwidth efficiently according to one aspect of the present embodiments is shown. In this nonlimiting example, the master 310 interleaves the address and transmits the interleaved address followed by the transaction to the DRAM memory 120. In this illustrative example, the master 310 is coupled to the DDR memory 120 through channel 320, e.g., 4 channels A3, A2, A1, and A0. However, it is appreciated that in other embodiments a different number of channels may be used, e.g., 8 channels, 16 channels, etc. As such, the description of the embodiment with 4 channels is for illustrative purposes only and should not be construed as limiting the scope of the embodiments.

In some examples, the master 310 interleaves the address [$a_{33}, a_{32}, a_{31}, \ldots, a_0$] associated with a memory location for a transaction resulting in an interleaved address 312. In this illustrative example, since there are 4 channels, only 2 bits of the address bits (also referred to as channel identifier bits) are needed to determine the appropriate channel, e.g., A0, A1, A2, or A3. In this illustrative example, the bits $a_8$ and $a_7$ of the address are used to determine the appropriate communication channel. In some embodiments, 00 may be associated with channel A3, 01 may be associated with channel A2, 10 may be associated with channel A1, and 00 may be associated with channel A0. It is appreciated that using bits $a_8$ and $a_7$ of the address to determine the appropriate channel is for illustrative purposes and that in other examples bits with different orders may be used. In one illustrative where 8 channels are used, 3 bits of the address bits are needed to identify the appropriate channel. Similarly, if 16 channels are used, 4 bits of the address bits are needed to identify the appropriate channel and so on. It is appreciated that in some embodiments fewer than 4 channels may be used, e.g., 2 channels may be used with one address bit such as $a_7$.

The master 310 interleaves the bits of the address. For example, bits $a_8$ and $a_7$ of the address that are $8^{th}$ and $7^{th}$ order bits are moved to be the highest ordered bits of the address, hence the 33 and 32 order bits of the address. The order of the address bits $a_{33} \ldots a_9$ of the address are changed to new order bits and the address bits $a_6 \ldots a_0$ of the address remain at the same order bits as before. In other words, the address bits [8:7] are shifted to the highest address bits [33:32] and are used to select the appropriate channel. Original bits [33:9] are shifted down by two order bits, and bits [6:0] remain unchanged. It is appreciated that higher order address bits above 34 can also remain unchanged. Accordingly, in some embodiments the higher order bits may be used to select the DRAM rank or chip-select bits, thereby supporting higher capacities without a change to the interleaving scheme.

Accordingly, the master 310 is used to efficiently access memory, e.g., DRAM memory 120, in an interleaved fashion, thereby alleviating memory accesses that cause bottleneck and inefficiencies. The DDR memory 120 receives the interleaved address 312 via an appropriate channel. In some illustrative embodiments, the DDR memory 120 may return a data 122 associated with the received interleaved data 312 to the master 310 via the appropriate channel, e.g., the same channel through which the interleaved address 312 was received. Accordingly, the bandwidth is utilized more efficiently when accessing the DDR memory 120.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system to support an operation, comprising:
   an inference engine comprising one or more processing tiles, wherein each processing tile comprises at least one or more of
      an on-chip memory (OCM) configured to load and maintain data for local access by components in the processing tile; and
      one or more processing units configured to perform one or more computation tasks of the operation on data in the OCM by executing a set of task instructions; and
   a data streaming engine configured to stream data between the a memory and the OCMs of the one or more processing tiles of the inference engine, wherein the data streaming engine is configured to interleave an address associated with a memory access transaction for accessing the memory, wherein a subset of bits of the interleaved address is used to determine an appropriate communication channel through which to access the memory; and
   a network interface controller configured to support address interleaving for a burst length greater than a burst length of the address.

2. The system of claim 1, wherein:
   each processing unit of the processing units in each processing tile includes one or more of
      a first processing unit configured to perform a dense and/or regular computation operation on the data in the OCM; and
      a second processing unit/element configured to perform a sparse and/or irregular computation task operation on the data in the OCM and/or from the first processing unit.

3. The system of claim 1, wherein the memory is a dynamic random access memory (DRAM).

4. The system of claim 1, wherein the memory is a double data rate (DDR).

5. The system of claim 1, wherein:
the data streaming engine is configured to
 move one or more communication channel identifier bits within the address to the highest order address bits, wherein the communication channel identifier bits identify an appropriate communication channel through which to access the memory; and
 shift down the address bits with a bit order higher than a bit order of the communication channel identifier bits before the moving, wherein the shifting down is by a same order as a number of the communication channel identifier bits, and wherein the moving and the shifting down forms the interleaved address.

6. A system comprising:
an inference engine configured to receive the data and to perform one or more computation tasks operation associated with the data;
a master configured to:
 interleave an address associated with a memory access transaction for accessing a memory, and wherein the master is further configured to stream a content associated with the accessing to the inference engine,
 move one or more communication channel identifier bits within the address to the highest order address bits, wherein the communication channel identifier bits identify an appropriate communication channel through which to access the memory, and
 shift down the address bits with a bit order higher than a bit order of the communication channel identifier bits before the moving, wherein the shifting down is by a same order as a number of the communication channel identifier bits, and wherein the moving and the shifting down forms the interleaved address; and
a network interface controller configured to support address interleaving for a burst length greater than a burst length of the address.

7. The system of claim 6, wherein the memory is a dynamic random access memory (DRAM).

8. The system of claim 6, wherein the memory is a double data rate (DDR).

9. The system of claim 6, wherein a subset of bits of the interleaved address is used to determine an appropriate communication channel through which to access the memory.

10. A method, comprising:
interleaving an address associated with a memory access transaction for accessing a memory, wherein interleaving of the address is for a burst length greater than a burst length of the address;
utilizing a subset of bits of the interleaved address to determine an appropriate communication channel through which to access the memory;
streaming data associated with the memory accessing transaction from the memory to an inference engine; and
performing one or more computation tasks operation associated with the data via the inference engine.

11. The method of claim 10, wherein:
the inference engine comprises a plurality of processing tiles, wherein each processing tile comprises at least one or more of
 an on-chip memory (OCM) configured to load and maintain data for local access by components in the processing tile; and
 one or more processing units configured to perform one or more computation tasks of the ML operation on data in the OCM by executing a set of task instructions.

12. The method of claim 10, further comprising:
moving one or more communication channel identifier bits within the address to the highest order address bits, wherein the communication channel identifier bits identify an appropriate communication channel through which to access the memory; and
shifting down the address bits with a bit order higher than a bit order of the communication channel identifier bits before the moving, wherein the shifting down is by a same order as a number of the communication channel identifier bits, and wherein the moving and the shifting down forms the interleaved address.

13. The method of claim 12, further comprising:
identifying an appropriate communication channel to communicate with the memory, wherein the identifying is through the communication channel identifier bits.

14. The method of claim 13, further comprising:
transmitting the memory access transaction associated with the address via the appropriate communication channel to the memory.

15. The method of claim 14, further comprising:
receiving the data associated with the address from the memory through the appropriate communication channel that the memory access transaction is received from.

16. The method of claim 12, further comprising:
maintaining an address bit with a lower bit order than that of the communication channel identifiers before the moving.

* * * * *